(12) United States Patent
Drake et al.

(10) Patent No.: US 7,589,630 B2
(45) Date of Patent: Sep. 15, 2009

(54) REMOTE SENSING AND COMMUNICATION SYSTEM

(75) Inventors: David A. Drake, Escondido, CA (US); Gregory M. Quist, Escondido, CA (US)

(73) Assignee: Hadronex, Inc., Escondido, CA (US)

( * ) Notice: Subject to any disclaimer, the term of this patent is extended or adjusted under 35 U.S.C. 154(b) by 0 days.

(21) Appl. No.: 11/979,293

(22) Filed: Nov. 1, 2007

(65) Prior Publication Data

US 2008/0174424 A1 Jul. 24, 2008

Related U.S. Application Data

(63) Continuation of application No. 11/134,691, filed on May 20, 2005, now Pat. No. 7,292,143.

(51) Int. Cl.
G08B 1/08 (2006.01)
(52) U.S. Cl. .............................. 340/539.26; 340/545.6; 340/693.5
(58) Field of Classification Search ............ 340/539.26, 340/539.27, 693.9, 870.17, 517, 521, 524, 340/545.1, 546, 545.2, 545.6, 551, 552, 686.1, 340/687, 689, 686.2, 693.5
See application file for complete search history.

(56) References Cited

U.S. PATENT DOCUMENTS

| 5,608,171 | A | 3/1997 | Hunter et al. ............ 73/861.63 |
| 5,811,688 | A | 9/1998 | Marsh et al. ............. 73/861.25 |
| 6,031,455 | A | 2/2000 | Grube et al. ........... 340/539.26 |
| 6,313,908 | B1 | 11/2001 | McGill et al. .............. 356/28.5 |
| 6,774,995 | B2 | 8/2004 | Quist et al. ................. 356/338 |
| 7,002,481 | B1 | 2/2006 | Crane et al. ................. 340/618 |
| 2005/0043059 | A1* | 2/2005 | Petite et al. ................. 455/557 |
| 2005/0195775 | A1* | 9/2005 | Petite et al. ................. 370/338 |
| 2005/0210340 | A1* | 9/2005 | Townsend et al. ........... 714/701 |

* cited by examiner

*Primary Examiner*—Toan N Pham
(74) *Attorney, Agent, or Firm*—The Nath Law Group; Jerald L. Meyer; Jonathan A. Kidney

(57) ABSTRACT

A remote sensing system and method for instrumenting the entries to manhole enclosures, in order to provide a platform and means for sensing environmental parameters within and around the enclosures and wirelessly transmitting those parameters to a distant site. The system comprises a housing with sensor for monitoring environmental parameter in the vicinity of the manhole. A microcontroller in the housing sends the parameters to a radio module, which transmits the parameters to a communication device for alerting a user that a manhole has been tampered with.

17 Claims, 5 Drawing Sheets

REMOTE SENSING AND COMMUNICATION SYSTEM

CROSS-REFERENCE TO RELATED APPLICATIONS

This is a continuation application of U.S. patent application Ser. No. 11/134,691, filed May 20, 2005 now U.S. Pat. No. 7,292,143, the contents of which are hereby incorporated by reference in their entirety.

FIELD OF THE INVENTION

This invention relates generally to a system and method for instrumenting the entries to enclosures, in order to provide a platform and means for sensing environmental or process parameters within and around the enclosures and wirelessly transmitting those parameters to a distant site.

BACKGROUND OF THE INVENTION

Sanitation and waste water systems are becoming increasingly expensive to operate and face daunting environmental, community and regulatory pressures. Agencies and organizations that manage sanitation systems face complex and costly problems. Three of the main problems facing sanitation system operators are sewage spills, treatment failure, and illegal dumping. The first two of these problems often result in uncontrolled spills of septic materials into the environment, causing environmental damage, health risks, and high cleanup and mitigation costs, while the third problem respectively generates a potential danger to treatment systems, the environment and uncontrolled liability for the sanitation operators.

Sewage spills are becoming more common and more costly for agencies and organizations that are responsible for handling waste disposal and treatment. Increased population is putting severe strain on sewage systems, systems are aging and becoming more susceptible to leaks and spills, and costs of spills which include clean-up, mitigation and fines by regulatory agencies are skyrocketing. A recent market analysis by the civil engineering firm of Brown and Caldwell entitled "What's a Spill Worth?, or a Brief Look at Community Values" surveyed 676 sewage agencies in California to capture the economic value of avoiding spills. The results of the survey revealed, for example, for spills on the order of 1000's of gallons, agencies were willing to spend $10 per gallon to avoid these spills. For larger spills, agencies were willing to spend $500,000 to more than $1 million to avoid spills reaching receiving waters such as rivers, lakes or the ocean. It is not uncommon for sanitation agencies to be fined millions of dollars for sewage spills, especially if they are large or reach receiving waters. Sewage spills also create serious public relations problems for operating agencies, and it is not uncommon for sewage to back up into residences and commercial facilities, creating serious liabilities for the agencies and very costly and time consuming clean-up.

Sewage spills are caused by many problems, but three primary causes are often cited: grease buildup from illegal discharges by restaurants, other commercial businesses or residences that use fat, lard or grease in food or industrial processing; structural problems in sewage pipes caused by the intrusion of plant roots or pipe breakages that are often exacerbated by objects such as rags that are thrown into the sewer; and "infiltration and inflow", overflows caused by leaks into the system that often occur during times of high rainfall or runoff. Sewage spills often begin, then, with sewage pipes that are either blocked or are at capacity and overflowing due to high flows. Currently there is no practical early warning system to provide system operators a cost-effective means to prevent a spill before it happens. Typically spills are detected by the community though serendipitous observation of water flowing out of manholes or odors around wet areas of ground around or above sewage lines. By the time sewage spills are noticed by the public, it is too late—the spill has already occurred, and it is just a question of how much sewage has spilled into the environment, whether the spill has reached clean receiving waters, how much it will cost and how long it will take to clean-up the problem and how large the fines will be.

A second major problem for sanitation agencies is a loss of treatment due to the killing off of beneficial treatment bacteria at the sewage treatment plant. A common part of the treatment process is the use of bacteria to naturally decompose organic materials in the waste water. If incoming waste is toxic to the beneficial bacteria, a massive die-off can occur without warning, and sewage can be spilled or otherwise discharged that is unknowingly under-treated or untreated. A means to provide an early warning of toxic materials that are traveling through the sewage collection system to the treatment plant could provide operators with the option of diverting the incoming flow into a holding pond until the slug of toxic material has dissipated would be useful and important to the sanitation industry. In addition, if the source of the toxic materials could be identified, the source could be stopped or fined as appropriate.

In addition, illegal dumping of materials into manholes is a common problem. The source could be illegal operations of commercial establishments that face large costs associated with disposal of hazardous waste, including dumping of trucked sewage and septic pumping, or simple vandalism. Covert dumping of illicit drug lab waste is an additional source of problems. Rather than pay high fees at legal dumping stations, truckers of hazardous waste, include septic waste, could access a remote manhole illegally and dump large quantities of materials with low probability of detection and prosecution. Such uncontrolled dumping into sewage systems is a major problem for the sanitation industry because the sewage system operators are ultimately responsible for what is dumped into their systems and the operators have little or no chance of catching or preventing illegal dumping.

Illegal access to manholes has forced some sanitation agencies to weld down their manholes, creating a significant deterrent to illegal access, but at the same time causing operational problems, including delayed or deferred maintenance or in the case of an emergency, significant delay in accessing a manhole through the manhole cover.

Current methods exist for the monitoring of level and flow in manholes, for example, two such products are the Hach (Loveland, Colo.) Sigma 1000 and the Marsh-McBirney Flo-Dar systems. These methods suffer from one or more of the following problems: (a) installation requires entry into the manhole, thus high cost and higher safety risk from entering the manhole; (b) the system requires wired communications, thus trenching around the manhole; (c) the system requires continuous 120 Volt AC power, thus trenching around the manhole; (d) the total installation is costly, limiting the deployment of these systems to no more than a few select manholes. A small municipality may have 5,000 to 10,000 manholes, and large municipality may have more than 100,000 manholes. In order to provide wide coverage, the total cost per manhole must be reasonable.

It is clear that a distinct need exists for a low cost, robust system and method to provide an early warning system to avoid many of the problems and costs that sanitation system operators face. Such as system should be inexpensive so that it can be widely deployed, provides wide area communications, and is rapid enough to give operators time to respond and prevent catastrophic failure before it occurs and affects the community and the environment. This system can also be a platform for a variety of sensors, for a variety of applications, including intrusion alarms, closed space monitoring for example for gases, water quality monitoring, traffic monitoring, and environmental or pollution monitoring, and by virtue of distribution in a wide coverage urban area, such a system can have multiple uses in addition to manhole monitoring.

SUMMARY OF THE INVENTION

The present invention provides a system and method for combining self-contained power, electronics, communications, computational capability and sensors into a low cost and low power device integrated directly into and mounted on an enclosure barrier such as a manhole cover to provide sensing and rapid early warning of problems in the enclosure or around the enclosure barrier. Specifically, the invention includes a communications unit to provide communications from the device to a remote user of the system; a power source to provide constant and reliable power to the device; a microcontroller that can monitor sensor inputs and control communications and device operations; electronics that provide a means to provide appropriate power and current to the communications device, microcontroller, and sensors; and sensors which monitor parameters inside the enclosure or in the vicinity near the enclosure. The present invention also provides a low cost and low labor installation and maintenance process. Instead of expensive and time-consuming trenching at a site to provide power and communications, the invention provides a means for very low power consumption thereby enabling the use of small standard off-the-shelf battery packs to provide months of continuous operation, and wireless communications that eliminate the need for wires.

The system and method of the present invention also provides the following: (a) autonomously operations for months without need for external power, although external power may be used if it is available; (b) ease of integration and mounting into the enclosure barrier such as a manhole cover so that the operation of the enclosure barrier is not impeded and physical entry into the enclosure for installation is unnecessary; (c) rapid and reliable communications from the remote site to various real-time receivers that may include computers and electronic mail, personal digital assistants, phones, cell phones, and pagers; (d) generation of immediate alarms when thresholds of sensors have been exceeded or switches have been tripped; (e) monitoring of various conditions in and around the enclosure at short enough time intervals to provide sufficient time for communications and response in time for the prevention of an activity to be avoided, such as a sewage spill or illegal entry.

In the preferred embodiment, the present invention provides sanitation system operators a new way to routinely monitor and detect spills, anticipate overflows, detect illegal entry into the manholes, as well as monitor other environmental and process parameters of the sewage system such as flows, levels, gas content and sewage content. Furthermore, the invention detects spills rapidly to cause a response, thereby reducing damage to the environment, including potential pollution to receiving waters such as streams, lakes or the ocean. In addition, this invention can significantly reduce costs for sanitation system operators who have strict liability for spills occurring in their systems. Because the system is integrated directly into the manhole cover, there is no installation in the manhole shaft itself and no need to enter the manhole, further reducing risk and costs of installation.

In another embodiment, the present invention can be used as a monitor for the environment surrounding the enclosure. For example, with the mounting on the underside of manhole covers, the invention can also be used to monitor street traffic, air quality in urban areas, or other environmental parameters. The invention could serve more generally as a sensor platform for a suite of sensors, which are directed at areas below the manhole, above the manhole, or both.

The foregoing, together with other features and advantages of the present invention, will become more apparent when referring to the specification, claims and accompanying drawings.

BRIEF DESCRIPTION OF THE DRAWINGS

The present invention will be better understood from the following detailed description of an exemplary embodiment of the invention, taken in conjunction with the accompanying drawings in which like reference numerals refer to like parts and in which.

DETAILED DESCRIPTION

Figure 1:
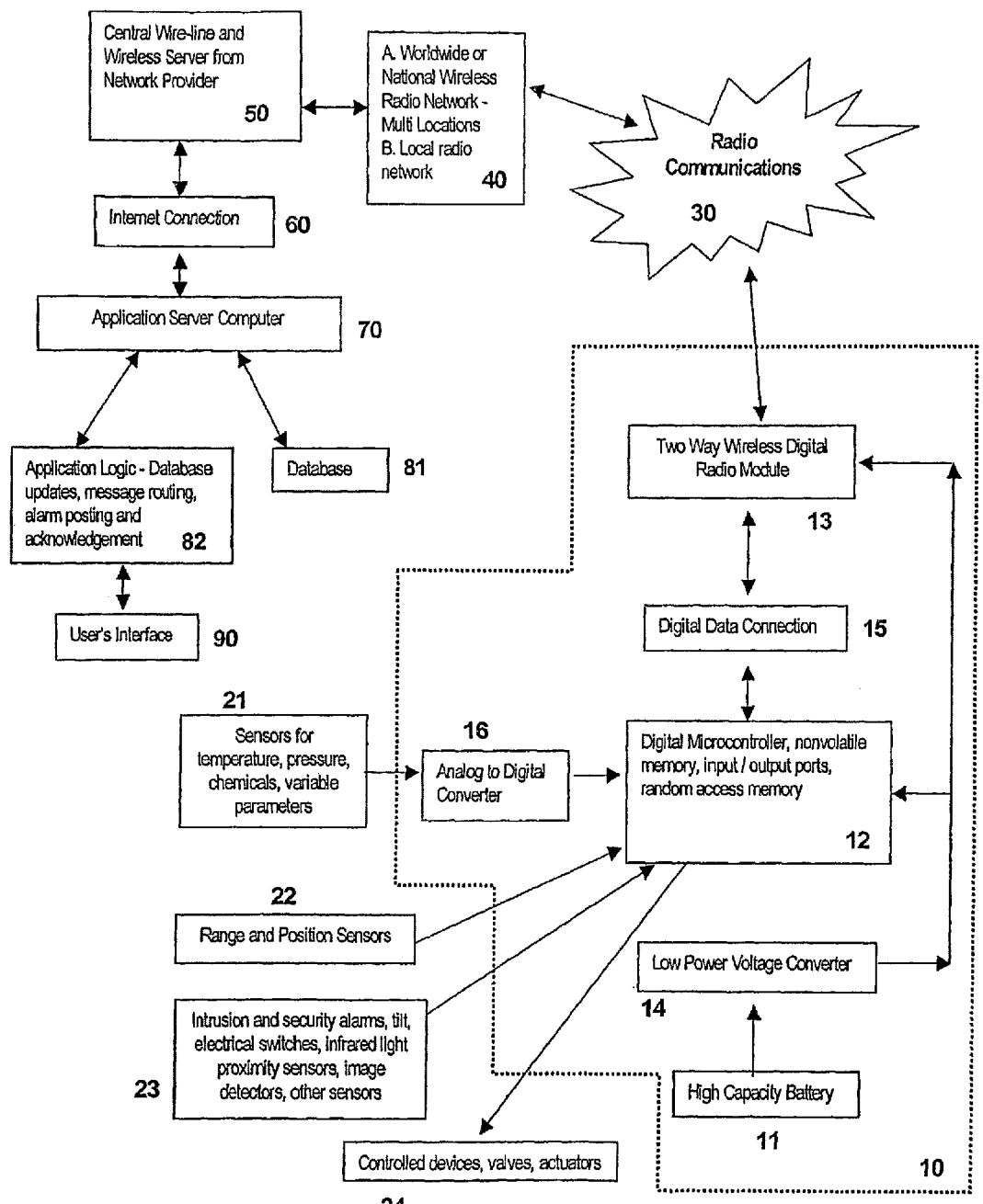
FIG. 1 shows a schematic block diagram of one embodiment of the present invention.

The present invention provides a system and method for combining self-contained power, electronics, communications, computational capability and sensors into a low cost and low power device integrated directly into and mounted on an enclosure barrier such as a manhole cover to provide sensing and rapid early warning of problems in the enclosure or around the enclosure barrier. The sensors include, but are not limited to, a level sensor, a flow sensor, a pressure sensor, a ranging sensor, an ultrasonic ranging detector protected by a water resistant fabric, a gas sensor, an odor sensor, a temperature sensor, an optical monitor, such as a video camera, still camera or an infrared sensor. Furthermore, the sensors can be physically disconnected from the manhole cover and mounted on the walls or the floor of the manhole. For example, a float switch may be remotely located at the bottom of the manhole with an infrared or ultrasonic means of contacting the housing. In the case of a the float switch no power is consumed until the float switch closes with rising fluid level, thus conserving power, such as a battery. Additional types of sensors can be physically disconnected from the manhole cover and communicate with the housing through wired or wireless means within the enclosure or manhole.

The invention includes a communications unit to provide communications from the device to a local or remote user of the system; a power source to provide constant and reliable power to the device; a microcontroller that can monitor sensor inputs and control communications and device operations; electronics that provide a means to provide appropriate power and current to the communications device, microcontroller, and sensors; and sensors which monitor inside the enclosure or the vicinity near the enclosure. The present invention also provides a low cost and low labor installation and maintenance process. Instead of expensive and time-consuming trenching at a site to provide power and communications, the invention provides a means for very low power consumption thereby enabling the use of small standard off-the-shelf battery packs to provide months of continuous operation, and wireless communications that eliminate the need for wires. Solar cells or a rechargeable battery that is recharged using direct electrical connections or capacitive or inductive connections from a portable device can also provide power.

The microcontroller is programmed with a command set that defines the states of operation of the system. Such defined states include, but are not limited to initial testing mode, field installation mode, normal operation mode, change reporting frequency, change sampling frequency, return current status mode, return historical data mode, reset historical data mode, change location text string, change alarm destination address strings, reset the communications channel, enable or disable alarms and send messages to system users. The commands come from manual commands provided by system users or from automatic scripts that run in an application server computer.

Unless otherwise indicated, the following terms will have the following meanings:

The term "manhole" shall be taken in its broadest sense to include, without limitation, underground vaults, for example manholes or utility vaults, as well as any other enclosed area, underground or above ground, that has instrumentation or materials or aspects in or about the enclosed area that may be monitored.

The term "manhole cover" shall be taken in its broadest sense to include, without limitation, covers for underground vaults, for example manholes or utility vaults, as well as enclosure barriers such as doors or walls for any other enclosed area, underground or above ground, that has instrumentation or materials or aspects in or about the enclosed area that may be monitored.

The term "hardware enclosure" shall be taken in its broadest sense to include, without limitation, the box and its contents that hold some or all of the following: the electronics, the power supply, input/output connections, the communications device, the microcontroller, sensors, and any environmental materials used to make the box rugged and weather and water proof.

The term "application server computer" shall be taken in its broadest sense to include, without limitation, a computer and communications system that can receive messages from the installed field unit and forward the messages to email addresses, pagers, personal digital assistants, cell phones and other means of notification of responsible parties. The server can also direct commands from system users out to the installed field units. The server also provides alarm acknowledgement, statistical record keeping, customer administration, report generation, maintenance record keeping and alerting, and security management. The application server computer can also translate terse machine-to-machine messages into a format that is understandable by a system user.

The term "system user" shall be taken in its broadest sense to include, without limitation, people who are using the system to sense and monitor various environmental and process parameters in their area of interest, for example, the manager or operator of a sanitation utility.

The term "alert" shall be taken in its broadest sense to include, without limitation, a message sent to a system user to notify them of a condition of concern in their system.

The term "installed field unit" shall be taken in its broadest sense to include, without limitation, the installation of the hardware enclosure on an enclosure barrier such as a manhole cover, including the antenna and all sensors required for operation of the unit in its intended manner.

The central component of the present invention is the instrumented manhole cover. The instrumented manhole cover integrates power, communications, electronics, microcontroller(s), and sensors into a compact low power and low cost package that mounts easily onto a manhole cover, providing a universal platform for sensors that can operate below or inside the manhole cover or above or outside the manhole cover. The purpose of this instrumented manhole is to communicate critical or time-sensitive information about the monitored aspects of the environment around the manhole. While the preferred embodiment discussed here involves the monitoring for sewage waters, the invention can also be applied, without limitation, to any monitoring application concerning an enclosed area that contains a critical asset as well as enclosed areas that can be used to monitor the environment external to the enclosure. It is presumed that in general the monitored area is difficult to provide electric power and wired communications to.

The present invention will now be described hereinbelow, and with reference to the drawings. FIG. 1 shows a schematic diagram of the components of a preferred embodiment of the system. Referring to FIG. 1, the major hardware components of the device are integrated into a single housing 10, which is affixed to the underside of a device such as, a manhole cover, an enclosure cover, a door, a window and a wall, and includes the following components: a high capacity battery 11 (although this power can also be provided by standard AC line power or other sources) which has sufficient capacity to provide power for at least several months and which provides power for a digital microcontroller 12 and a two-way wireless radio module 13 through a low voltage power converter 14. The digital microcontroller 12 communicates to the two-way wireless radio module 13 through a digital connection 15. Communication ports for external sensors for the hardware package 10 are provided either through an analog to digital (A/D) converter 16 for sensors such as temperature, pressure, chemical sensors, or other variable parameters 21 that provide an analog output or directly to the digital microcontroller 12 for range and position sensors 22 or intrusion alarms 23 that provide digital or switch signals. Output ports exist on the digital microcontroller 12 to control output devices such as valves or actuators 24. The two-way wireless digital radio module 13 communicates via radio waves 30 (although this communication can also be done through land lines) through either a worldwide or national wireless radio network, or through an existing local radio network 40. This wireless network 40 then communicates either through a wire line or wirelessly to a central server 50 that is provided by the network provider and receives the parameters transmitted from the external antenna. (The antenna is designed and tuned to operate in close proximity to the metallic surface of a manhole cover.) The central server 50 communicates through an Internet connection 60 to the application server computer 70, which keeps the database for the operation of the system 81 as well as all the application logic for the system 82, including the user's interface 90. The user's interface can include many devices or methods, including without limitation, pagers, cell phones, personal desktop computers via email, laptop computers using wireless connections, land line phones, and audio and visual alarms. Furthermore an additional antenna may be located on the underside of the manhole cover for direct communications to the central server through the ground or in the event of the inversion of the manhole cover.

In an alternative embodiment, data or information from multiple manholes can be compiled. This information can be compiled using local radio, wired, infrared, or acoustic communications that coordinate alarms locally for transmission to the application server computer by a shared, long range communication system. The application server computer can also provide alarm forwarding to system users and can establish the alarm state in a database. In turn the system user can acknowledge that alarm which notifies the installed field unit or housing and records the acknowledgement in the application server computer database. The database can then be queried to determine the responsiveness of the system user to an alarm. Additionally, the installed field unit can conserve battery power by varying the time between samples as a function of season of the year, manual commands from the application server computer, or observation of the physical conditions measured over a period of time.

The preferred embodiment of the invention, as applied to sewer manhole covers, is described hereinbelow. This embodiment is in no way limiting of the invention and serves solely as an illustrative example of the application and use of the present invention.

Figure 2:
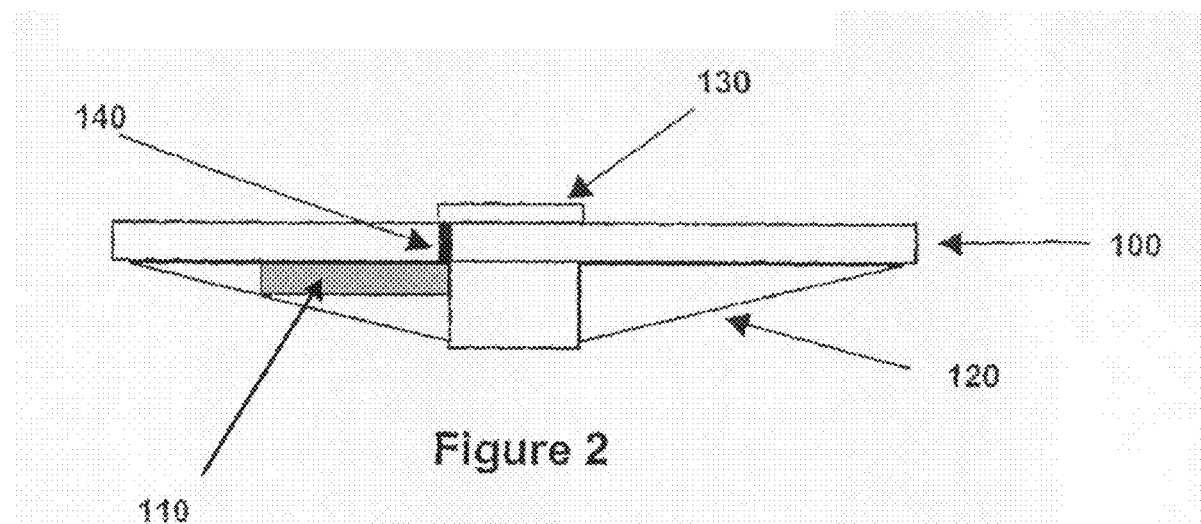
FIG. 2 shows a schematic diagram of a typical manhole cover with the instrument and antenna attached directly to the manhole cover.

This preferred embodiment of the present invention includes two primary sensors: a tilt and acceleration (accelerometer) sensor that can detect the movement of the manhole cover from the resting position, and an ultrasonic ranging device that detects the level of the water in the sewage manhole. Additionally, an optical means, a contact switch and a magnetic switch can be utilized to detect if the manhole cover has been moved or opened. All of the power, communications, electronics, microcontroller and sensors are combined in a small box—the "housing" that is affixed directly to the bottom of the manhole in a way that does not impede opening of the manhole cover, or require entry into the manhole for installation. The main components of the system are shown in FIG. 2. Typical manhole covers 100 are made of steel or cast iron, and if they are "traffic rated", that is, capable of supporting loads from road vehicles, they are very heavy and rugged and include support vanes 120 on the bottom of the cover. The housing 110 is mounted on the bottom of the manhole using a mounting bracket that is screwed into the manhole cover, or directly mounted onto the manhole cover with screws, or glued onto the manhole cover with traffic rated epoxy. The housing 110 is small enough to be protected from impact by the manhole ribs 120 or extensions from the manhole ribs. The only external connection for the housing is the antenna 130, which is connected through a small hole, drilled in the manhole cover. The antenna cable 140 connects the housing 110 to the external antenna 130, which transmits the parameters to a communication device, such as a cell phone, a pager, a personal digital assistant, or a personal computer.

Figure 3:
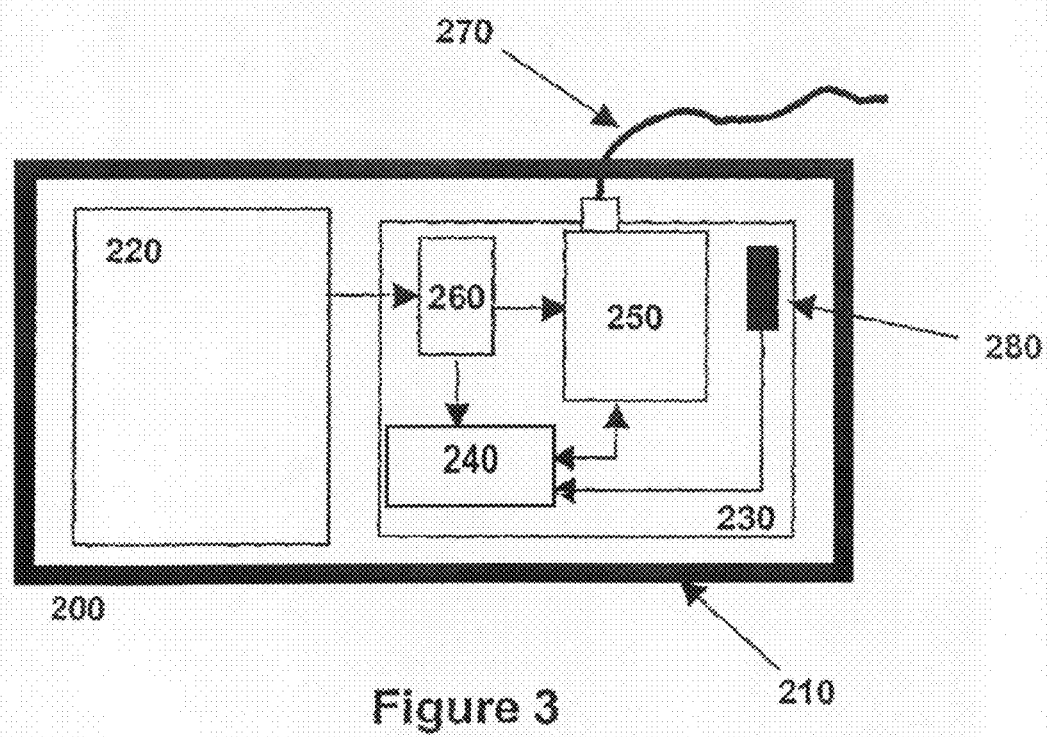
FIG. 3 shows a top view of a layout of the battery, electronics, tilt sensor and communications in a housing.

FIG. 3 shows a top view of a preferred schematic layout of the components of the housing 200. All of the components of the hardware are packaged in a NEMA-4 (produced for example by Hoffman, Anoka, Minn.) or better rated enclosure 210 that is rugged and provides water resistance and is environmentally sealed. In FIG. 3, the high capacity battery 220 is chosen to maximize the capacity of the battery in amp-hours (A-H) for the volume of the battery. Typical batteries that can be used in the preferred embodiment of the invention are primary lithium batteries. For example, a six-volt supply with about 10 A-H can be constructed of four series pairs of AA three-volt lithium cells in parallel using standard off-the-shelf batteries from, for example, the Duracell® Lithium Model 245 from the Duracell® Corporation. With a total target typical amperage draw of the housing 200 of about two milliamps (mA), a battery pack of about 10 A-H capacity can provide sufficient power for more than six months of continuous operation. Standard alkaline batteries are an alternative primary battery type. While primary batteries 220 are the power source of choice for low cost, small package size applications, the present invention is not limited to this type of power source. If external AC or DC power is readily available, it can be used as a substitute, or rechargeable batteries, such as nickel metal hydride batteries can be used in conjunction with a low current trickle charge from an adaptation such as a solar cell to charge the batteries during daylight hours.

The high capacity battery 220 in FIG. 3 provides power through a low voltage power converter 260 to two sources in the hardware package, the digital microprocessor 240 and the two-way digital radio module 250. Typically the battery 220 is at 6 volts, and the microprocessor 240 and the two-way radio module 250 operate at lower voltages. Operating voltages are minimized, and hardware is put into "sleep" mode when possible in order to minimize power consumption. In the preferred embodiment, the microprocessor 240 is a Basic Stamp 2pe (Parallax® Corporation), and the two-way digital radio 250 is a Karli ReFlex paging unit (Advantra® Corporation). A coaxial connector cable 270 is connected to the Karli unit 250, and this connector leads to the external antenna, which is mounted, on the manhole cover. The Karli unit 250 is capable of measuring the ambient temperature as well as the input voltage to the pager, thereby providing additional sensing capability that can be reported and stored by the microprocessor.

The low voltage power converter 260, the Karli two-way pager 250, and the microprocessor 240, are all mounted on a single printed circuit (PC) board 230. The tilt and acceleration sensor 280 is also mounted on this PC board. The tilt and acceleration sensor 280 acts as a switch, which is either open (normal state) or closed (the sensor has been tilted or accelerated). The state of the tilt and acceleration sensor 280 is checked typically once every second, but this frequency is variable and application specific. If the state of the tilt and acceleration sensor 280 is found to be closed, a signal is sent through the pager 250 to the wireless network and the time and date of this closed state is stored in the microprocessor 240.

Figure 4:
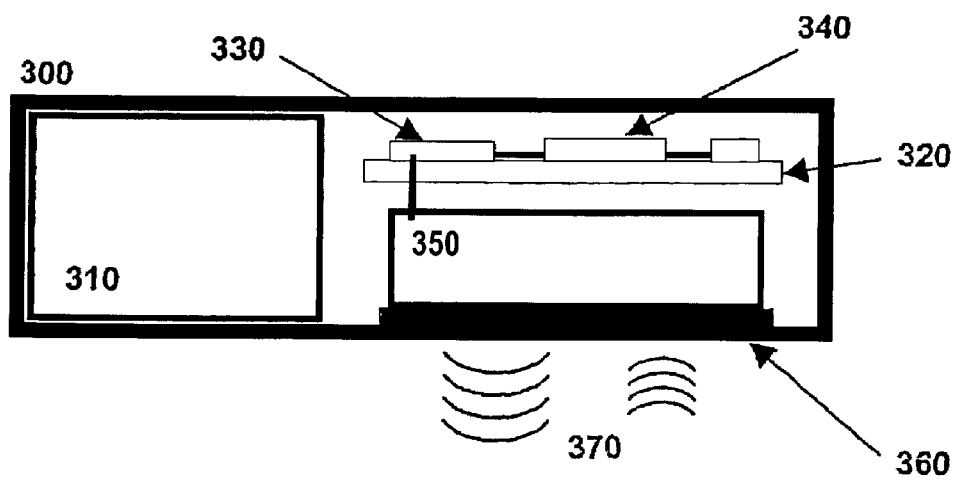
FIG. 4 shows a side view of the same layout in the housing, including the ultrasonic sensor.

FIG. 4 shows a side view of the housing 300, analogous to FIG. 3 showing the top view. The battery 310 provides the power for the housing. Power is provided for the microprocessor 330 and the two-way pager 340 on the electronics board 320, and the ultrasonic ranging sensor 350. An example of a low cost ultrasonic ranging sensor is the PING ultrasonic sensor (Parallax® Corporation), which provides range information to maximum range of about 11 feet, which covers the majority of manhole depths. A waterproof or water resistant cover 360, which does not adversely affect the performance of the ultrasonic sensor 350, is placed in front of the ultrasonic sensor. At intervals of approximately once every ten minutes, the ultrasonic sensor 350 is turned on and makes a measurement of range using ultrasonic waves 370. If the range result comes back as different from normal, a signal is sent through the pager 340 to the wireless network.

Figure 5:
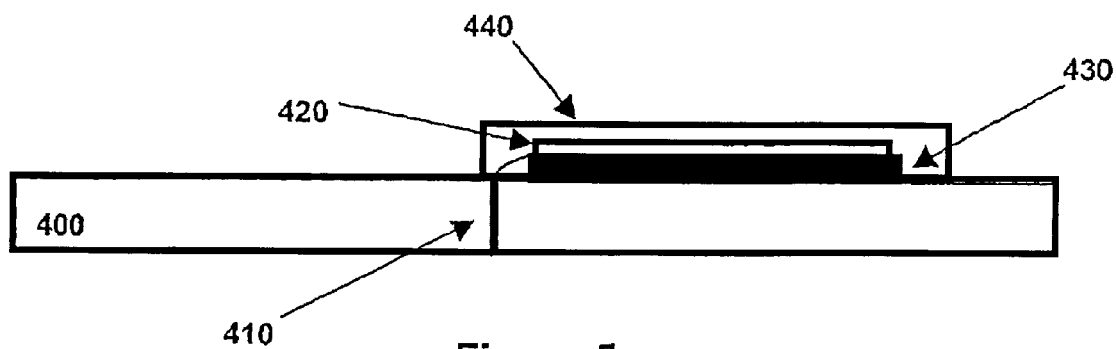
FIG. 5 shows a schematic drawing of the antenna mounting on the manhole cover.

FIG. 5 shows the antenna mounting on the manhole cover 400 in the preferred embodiment of the invention. A small hole is drilled in the manhole cover and a coaxial cable 410 connected directly to the pager in the housing comes from underneath the manhole cover and is connected to a low profile strip antenna 420. The strip antenna 420 is offset from the manhole cover top surface by a dielectric spacer 430, typically 1 mm to 5 mm thick. The spacer, strip antenna, and connection are together encased in traffic-rated epoxy 440 of the type used to attach reflectors to road surfaces.

In the preferred embodiment of the present invention, radio signals are sent through a commercial two-way paging network known as ReFLEX, developed by Motorola® Corporation. The ReFLEX network provides a secure, robust two-way communications method-using signals between 900 MHz and 1000 MHz. The ReFlex network includes geographically distributed transceivers that communicate both to the installed field units by radio and to the Internet with wireline connections. This allows communications from any Internet connected system (such as the application server computer) to securely communicate to installed field units. The ReFLEX network protocols are licensed from the American Association of Paging Carriers. ReFLEX communications have the advantage of wide geographic dispersal, generally superior to cellular coverage and lower monthly costs. The ReFLEX network does require sophisticated software for supporting both the installed field devices and the application server computer. The ReFLEX system is designed to pass terse digital messages that identify specific status information, such as a security alert or a water level that is too high. This information may be communicated and coded in as little as one or two bytes of information. The message is marked with a unique identifying installed unit number and so further identification is not required. The application server can reformat a terse one or two byte message into a more informative message for sending to a system user. A hexadecimal "C5" might be translated into "Security Entry Alert" and the unique installed filed unit number of "345123" might be translated to "5400 block of Main street". This combined message would be sent by email, or Short Messaging Service (SMS) to a cell phone as a text message, to a pager, or to a computer based Supervisory Control and Data Acquisition (SCADA) system that is monitored by system users. The intent is the use of the ReFLEX network for rapid notification of responsible parties in a continuous, geographically independent way.

In the preferred embodiment of the present invention, which is just one possible configuration and application of the invention, communications occur in the one of the following manners, as examples, without limitation. First, as a default, each installed hardware package at a given manhole cover sends a status message to the application server computer two times each day. The purpose of this message is to assure the system user that each installed hardware package and the supporting wireless communications system is working properly. Referring to FIG. 1, a maintenance alert is sent to the system user from the application server computer 70 if the expected message from the installed housing 10 does not occur in a timely manner, indicating a potential problem with either the communication to the site or instrumentation at the site. A secondary purpose of this message is to send nominal operating parameters, including without limitation, the temperature history at the site, the wireless signal level history at the site, and the battery voltage or input voltage level. Second, the system user can send a message to the installed hardware package essentially asking for a response to the system user that the installed hardware package is operating normally. Third, the system user can request that the installed hardware package send back data stored in the microprocessor memory, including without limitation temperature history, battery levels, wireless signal levels, alarm types and times, and current status of the sensors. Fourth, the system user can send a message to the installation site changing the operational parameters, including without limitation thresholds for alarms, frequency of reporting, frequency of interrogating the sensors, nominal manhole depth, addresses for maintenance messages and alerts and the address of the installed field unit. Fifth, the installed field unit can send self-generated maintenance messages or alert messages to the wireless network based on pre-set conditions. An example of how maintenance messages and alerts can be sent is discussed herein below.

Figure 6A:
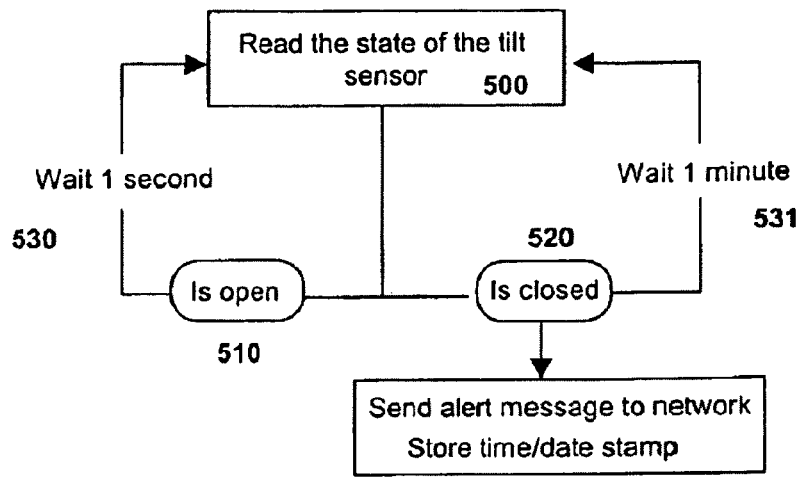
FIG. 6A shows the flow diagram for the tilt sensor in one embodiment of the invention.
Figure 6B:
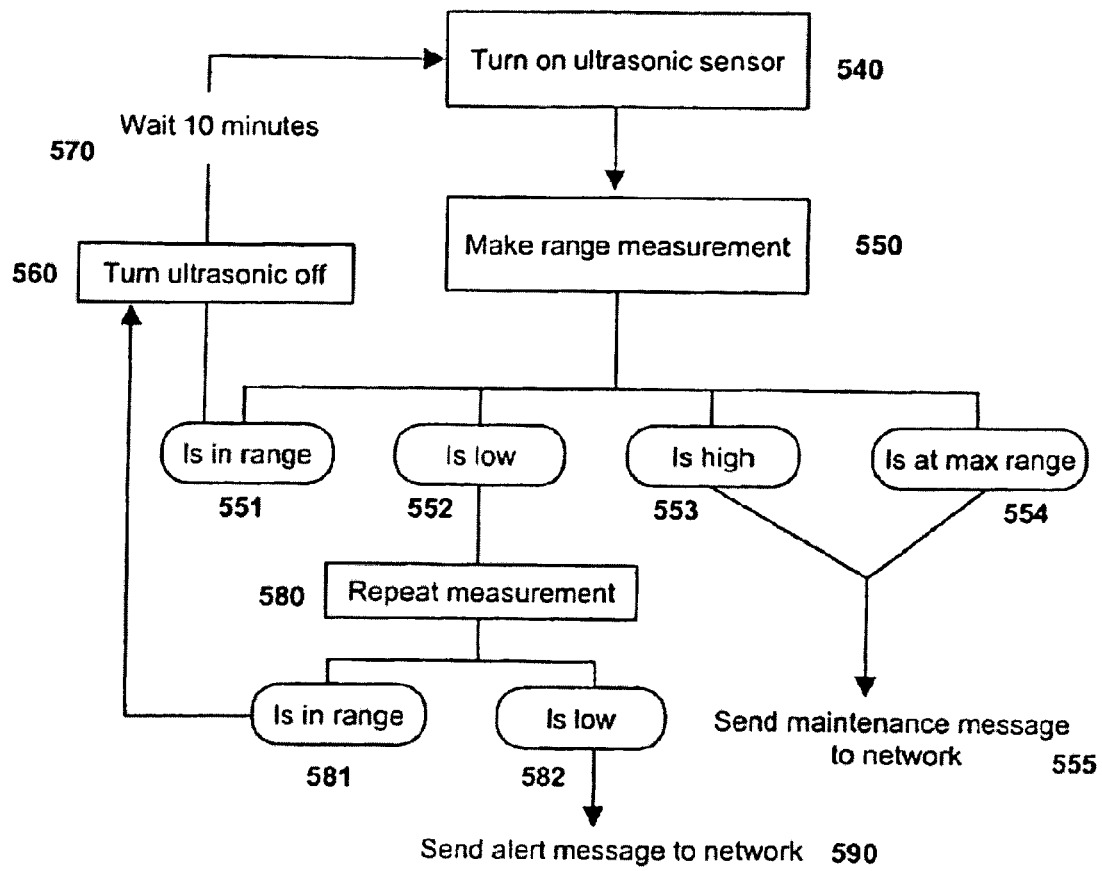
FIG. 6B shows the flow diagram for the ranging sensor in one embodiment of the invention.
Figure 7:
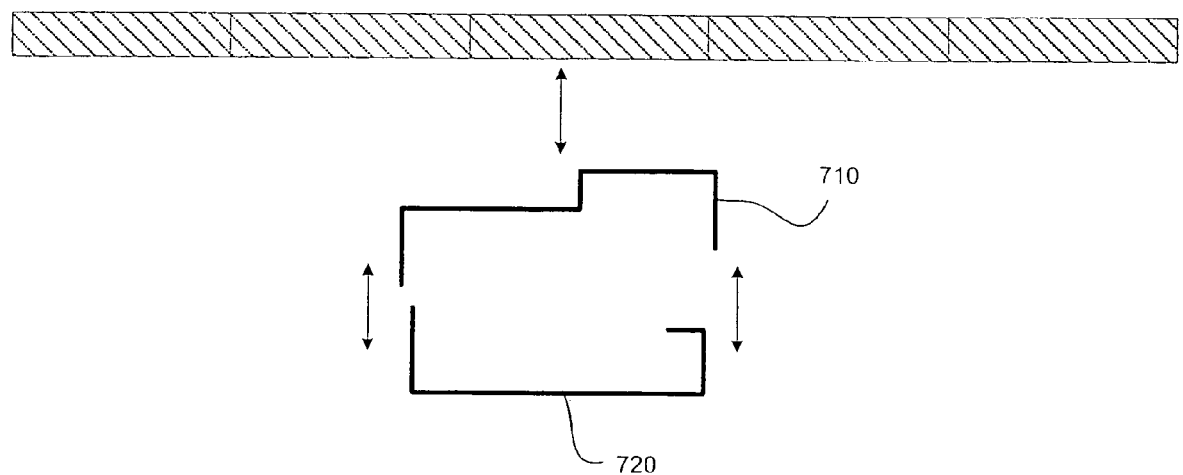
FIG. 7 shows side views of one possible bracket configuration.

As an example, in the preferred embodiment of the present invention, two sensors are used: a tilt/acceleration sensor set to alarm if the manhole cover is tilted or moved from its resting position, and an ultrasonic ranging detector that measures the height of the water in the manhole. The following procedures are meant to be illustrative—these can be handled in a variety of ways, and the following description is not intended to limit the scope of the invention. FIG. 6A shows the flow diagram and logic for sending an alert based on the state of the tilt sensor. The tilt sensor is a binary device that acts as a switch. When the tilt sensor is at normal conditions, it is open. When it is tilted or accelerated, it is closed. The state of the tilt sensor is read 500. If the tilt sensor is open 510, the microcontroller waits one second 530 (although any time interval greater than the cycle time of the microprocessor can be used) and reads the tilt sensor again. This frequency is high enough to ensure that if the manhole cover is moved, the tilt sensor will capture the change in state. If the tilt sensor is read to be closed 520, the time and date of that event is logged in the microcontroller and an alert is sent to the paging network system for distribution to the system user's based on a pre-arranged protocol, including, for example law enforcement in the case of an illegal entry. A minute passes 531 (although this interval can be longer or shorter) and the tilt sensor is read again and the process starts over. FIG. 6B shows the flow diagram for sending an alert based on the reading of the ultrasonic ranging sensor. Since the ultrasonic sensor consumes power, it is turned on only when used. This is shown in FIG. 6B as 540. Once the ultrasonic detector is turned on, it immediately makes a ranging measurement 550. There are at least four outcomes of the range measurement: it is "in range" 551, meaning the measurement matches the expected value of distance to the bottom of an unflooded manhole as stored in the microprocessor, for example; it is "low" 552, meaning the distance is shorter than expected, indicating a possible flooding condition; or it is "high" 553 or is at "maximum range" 554, both conditions suggesting that the ultrasonic sensor is not operating properly and may require maintenance. In the case of "in range" 551, the ultrasonic sensor is turned off 560, and another measurement is made in 10 minutes 570 (although this time interval can be anything greater than the cycle time of the microprocessor) and the process repeats. This is the normal and expected condition. In the case of a "low" measurement 552, a repeat measurement 580 is made to check this "low" measurement and decrease the incidence of false positives. If the measurement returns as a low measurement 582, an alert is sent to the network 590 to be delivered to the system's users based on a pre-arranged protocol, including without limitation, for example, to the system operator's pager and cell phone and the system operator's email. If the repeat measurement 580 returns "in range", then it is assumed that the previous measurement was an error, the ultrasonic detector is turned off 560, the nominal 10 minute wait period repeats 570, and the sequence starts over. This repeated measurement process can occur any number of times without limitation to reduce the chances of false positives as well as to track the rising water in the manhole as a function of time. In the cases of a "high" measurement 553 indicating that the nominal range increased, which is physically unlikely or a "max range" measurement 554 occurs, a maintenance message is sent to the network 555 to be delivered to the system's users on a pre-arranged protocol. FIG. 7 shows a side-view illustration of one possible bracket for use in the exemplary embodiments. In particular, the bracket may be a one piece bracket or a multiple piece bracket, as shown in FIG. 7. The upper piece 710 may be attached to the interior side of the manhole cover 100, in accordance with the methods described earlier, such as, for example, via screwing, glue, and so forth. As such, it is not necessary for the bracket 710 to penetrate through the entirety of the manhole cover 100. The bottom piece 720 may therefore be attached to the upper piece 720 through any known means. The bracket provides a very convenient mechanism for securing the housing 200 to the manhole cover 100 without requiring major "reconfiguration" of the manhole cover 100 or providing external access to the housing 200.

Although the foregoing invention has been described in some detail by way of illustration and example for the purpose of clarity and understanding, it will be apparent to those of ordinary skill in the art in light of the disclosure that certain changes and modifications may be made thereto without departing from the spirit or scope of the intended claims.

What is claimed is:

1. A remote sensing system comprising:
   an environmentally secure housing having communication ports for sensors;
   at least one sensor coupled to at least one of the communication ports, the at least one sensor monitoring parameters in a vicinity of the housing;
   a bracket for supporting the housing, securable to an interior surface of an entry cover in a manner that does not require entire penetration through the entry cover, the bracket providing at least one opening for operation for the at least one sensor;
   a microcontroller within the housing coupled to the communication ports;
   a two-way communication module coupled to the microcontroller;
   a connector cable connected to the two-way communication module which leads to an external antenna for transmitting the parameters to a remote communication device; and
   a power means for providing power at least to the microcontroller, sensors, and two-way communication module, wherein parameters received from the at least one sensor is processed by the microcontroller and forwarded to the two-way communication module for transmission.

2. The system of claim 1 further comprising a central server away from the remote communication device,
   wherein the central server receives by way of the communication device the parameters transmitted from the external antenna, and
   wherein the central server is in communication with an application server computer that stores the parameters.

3. The system of claim 1, wherein the parameters are environmental or process parameters.

4. The system of claim 1, wherein the communication device is selected from the group consisting of: cell phone, pager, personal digital assistant, and personal computer.

5. The system of claim 1, wherein the entry cover is selected from the group consisting of: an enclosure cover, a door, a window, a wall and a manhole cover.

6. The system of claim 1, wherein the at least one sensor is selected from the group consisting: of a level sensor, a flow sensor, a pressure sensor, a ranging sensor, an ultrasonic ranging sensor, a gas sensor, a humidity sensor, a temperature sensor, a tilt sensor, an acceleration sensor, a chemical sensor, and an optical monitor.

7. The system of claim 1, wherein the at least one sensor monitors if the entry cover has been moved, and
   wherein, if the entry cover has been moved, an alarm is triggered to notify a user.

8. The system of claim 1, wherein the at least one sensor monitors for entry in a space near the entry cover, and
   wherein, if entry has been detected, an alarm is triggered to notify a user.

9. The system of claim 1, wherein the microcontroller is programmed with a command set that defines states of operation selected from the group consisting of initial testing mode, field installation mode, normal operation mode, change reporting frequency, change sampling frequency, return historical data mode, reset historical data mode, change location text string, change alarm destination address strings, reset the communications channel, enable alarm, disable alarm and send message to system users.

10. The system of claim 1 further comprising output ports on the microcontroller to control output devices.

11. The system of claim 10, wherein the output devices are selected from the group consisting of valves and actuators.

12. The system of claim 1, wherein the bracket is mounted on an underside of a manhole cover,
   wherein the at least one of sensors is a ranging sensor for measuring a height of water in an enclosure selected from the group consisting of: underground vault, manhole, utility vaults, underground enclosed area, above ground enclosed area.

13. The system of claim 12, wherein if the ranging sensor detects the height of the water in the manhole above a predetermined level, an alert is sent to a user.

14. The system of claim 1, wherein the least one of said sensors is mounted on a wall or floor of the manhole.

15. The system of claim 1, wherein the microcontroller, a low-voltage power converter, and a tilt and acceleration sensor are mounted on a single printed circuit board.

16. A remote sensing system comprising:
   environmentally secure means for housing having communication ports;
   means for sensing a parameter in a vicinity of the means for housing coupled to at least one of the communication ports;
   means for supporting the means for housing to an interior of an entry cover, the means for supporting providing an attachment mechanism that does not entirely penetrate through the entry cover and providing at least one opening for operation of the means for sensing;
   means for processing data a within the means for housing coupled to the communication ports;
   means for two-way communication coupled to the means for processing data;
   means for radiating and receiving electromagnetic energy;
   means for coupling signals between the means for two-way communication and the means for radiating and receiving;
   means for providing power to at least the means for sensing, the means for processing, and the means for two-way communication, wherein data received from the means for sensing is processed by the means for processing and forwarded to the means for two-way communication for transmission via the means for radiating and receiving.

17. A method for remote sensing comprising:
providing an environmental secure housing with at least one communication port therein for sensor hookup;
coupling at least one sensor having the ability to monitor parameters in a vicinity of the housing, to a first communication port;
providing a removable bracket for supporting the housing, the bracket having at least one opening for operation of the sensor;
attaching the bracket to an interior side of an entry cover in a manner that does not require entire penetration of the entry cover;
coupling an antenna to a second communication port;
processing parameters forwarded by the sensor;
forwarding the processed parameters to a two-communication transceiver; and
transmitting the processed parameters to a remote communication device.

* * * * *